March 16, 1937.    R. DE FILIPPIS    2,073,626
BRAKE
Filed May 15, 1933    2 Sheets-Sheet 1
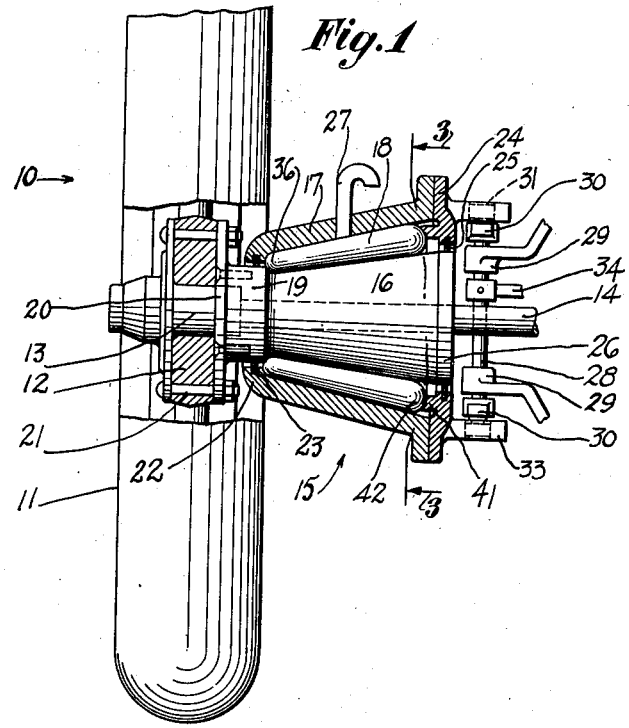
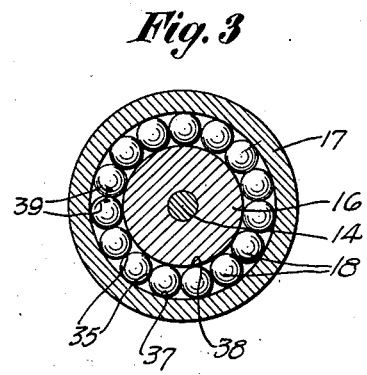
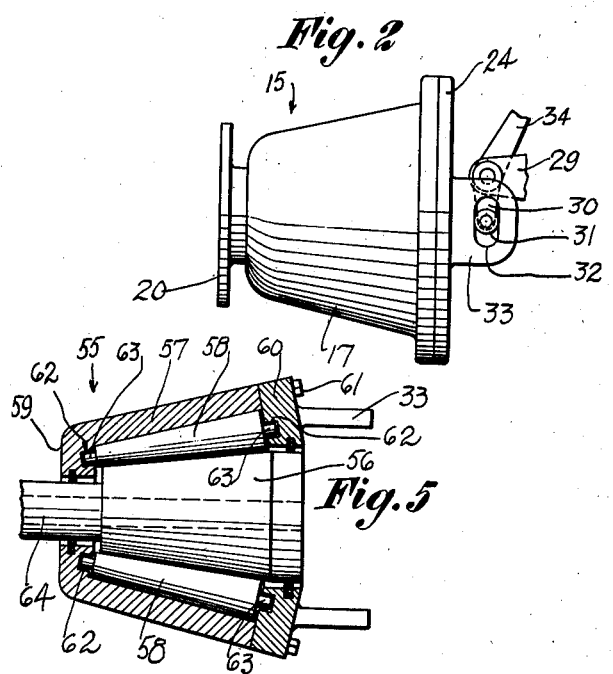
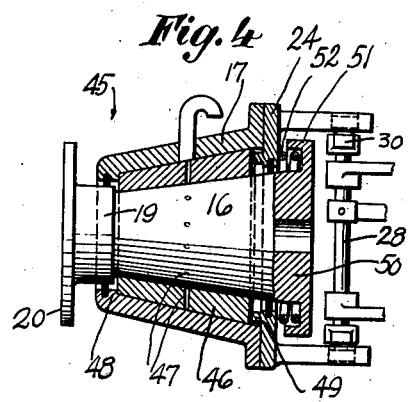
INVENTOR
Raymond de Filippis
BY
ATTORNEY

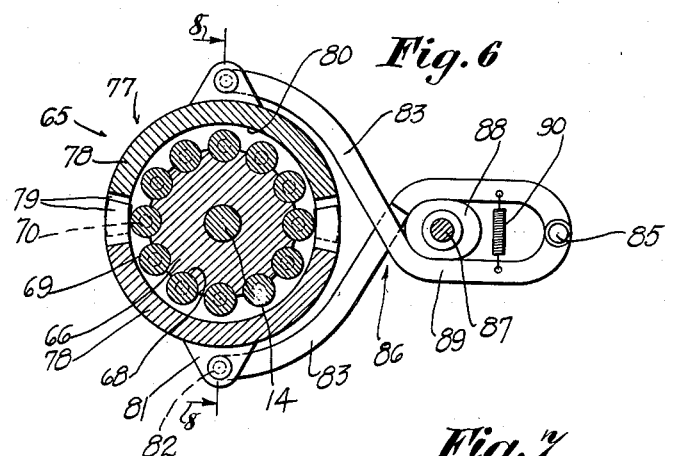
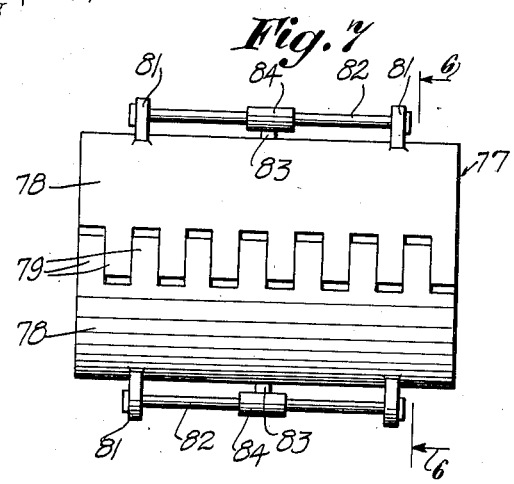
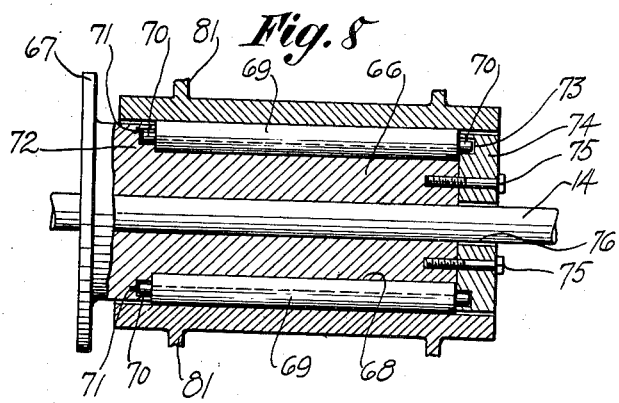

Patented Mar. 16, 1937

2,073,626

UNITED STATES PATENT OFFICE 2,073,626

BRAKE

Raymond de Filippis, Brooklyn, N. Y.

Application May 15, 1933, Serial No. 671,017

15 Claims. (Cl. 188—80)

This invention relates to braking devices such as brakes particularly adapted for use on automobiles, locomotives, and other vehicles, and also for general industrial use.

One object of the invention is to provide a device of the character described having improved means whereby a full braking action may be obtained with the exercise of little power, so that the elaborate pneumatic apparatus in use on railroad trains and the expensive booster systems in use on automobiles may be eliminated.

Another object of the invention is the provision of a device of the nature set forth wherein a uniform reliable braking action may be produced without using brake linings.

Another object of the invention is to furnish a device of the nature set forth having relatively few and simple parts, and which is inexpensive to manufacture, durable, reliable and efficient in use.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawings, wherein like parts are designated by the same reference characters throughout the several views.

In the drawings:

Figure 1 is a view in vertical section with parts in elevation and other parts removed, showing a device embodying the invention.

Fig. 2 is a top plan view thereof, with parts removed.

Fig. 3 is a vertical sectional view taken on line 3—3 of Fig. 1.

Fig. 4 is a vertical sectional view with parts removed, showing a modification of the invention.

Fig. 5 is a view in vertical section of a device generally similar to that shown in Fig. 1, but having a modified roller mounting means.

Fig. 6 is a transverse cross sectional view of a further modification of the invention, with actuating parts in elevation, and showing the brake in released position.

Fig. 7 is a view in front elevation of the device.

Fig. 8 is a vertical sectional view taken on line 8—8 of Fig. 6, but with the brake in locked position.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The acompanying drawings, therefore, are submitted merely as showing the preferred exemplification of the invention.

Referring in detail to the drawings, 10 denotes a device embodying the invention, and the advantages of which will be particularly clear when considered in connection with a conventional automobile wheel 11. The latter may include any well known hub and bearing 12, 13 and shaft 14. Connected in fixed coaxial relation with the wheel is my novel brake 15.

The brake 15 includes, in general, an inner race 16, and outer race 17 and rollers 18 therebetween, the races being concentric, and all of the members 16, 17 and 18 being conoidal in the same general direction, with the rollers frictionally interengaging each other in counteracting relation to produce the braking action. More particularly, the race 16 may have at its smaller end an annular shoulder 19, beyond which is a securing means such as a flange 20 adapted to be secured to the hub 12 in any desired manner, as by bolts 21. The shaft 14 may freely extend coaxially through the inner race member.

The rollers 18 form a continuous series, the units of which are in side by side relation and are of conoidal form, tapering in the same direction as the race 16.

The race 17 is of conoidal and generally symmetrical form with the race 16 but tapers more sharply than the latter according to the angle of the rollers. Its smaller end may have an annular shoulder 22 having a sealing means such as a felt ring 23 adapted to contact the cylindrical surface of the shoulder 19. At its larger end the race or cone 17 may have a flange to which may be suitably secured an annular end plate 24 having a corresponding ring 25 of felt or other material secured thereto for engaging an adjacent cylindrical portion 26 of the race 16. In this way lubricant supplied through a breather 27 connected to cone 17 is maintained in the region of the rollers.

For causing an axial movement as between the races and rollers, as by moving one of the races, such as the race 17, any desired means may be employed. For example, a rotary shaft 28 may be carried against longitudinal movement in any suitable fixed bearings 29 that may be vertically spaced therealong with the shaft 28 clearing the shaft 14. The shaft 28 may extend beyond the bearings to carry at its upper and lower ends a cam means such as crank arms 30 having rollers 31 engageable in cam slots 32 of the lugs 33 that are secured to the plate 24. On imparting an angular motion to the shaft 28, as by means of an arm 34 fixed to the shaft and connected to any conveniently positioned control (not shown), a uniform pull is exerted on the cone 17 along a central diametral plane and toward the central plane of the automobile for causing operation of the brake 15, without imparting any undue stresses to the wheel 11 or the mounting thereof. To cause release of the brake, the arm 34 may be moved in an opposite direction.

Since the rollers 18 are normally in uniform side by side contact with each other along straight lines defined by the points 35 which lie in a conoidal surface determined by the axes of the rollers, it may be immaterial, when the brake 15 is disengaged whether such rollers are in uniform contact with either of the races 16 or 17; in the illustration shown, such contact will preferably be maintained with the inner race, particularly as the relative axial movement of the outer race may be confined to very narrow limits, such as a fraction of an inch, or even a few thousandths of an inch. By thus confining the said axial movement, the rollers are maintained in their positions for instantaneous action. Thus, with the race 17 moving leftward to release, a small continuous annular clearance may result between said race and the rollers 18, which space may be desirably filled with lubricant of a low viscosity, so as not to induce too high a skin friction when the brake is idling. The shoulder 19 will of course prevent the rollers from moving out of their places, by engagement with the small ends 36 of the rollers that may be rounded to minimize friction. Suitable tolerances may be provided between the rollers 18 and the shoulders 19 and 22. Now when the race 17 is moved toward the right, it uniformly engages at 37 all the rollers 18 while the same contact the race 16 at 38. Each roller thus makes contact along four conical elements as determined by the two points 35, and the points 37 and 38. Since the rollers 18 turn in counteracting relation to each other at the points 35, as indicated by arrows 39, each roller 18 has two regions of frictional clutching action with adjacent rollers. In order to preclude any possibility that any of the rollers may advance beyond an adjacent roller and thus break the continuity of the circle determined by the axes of the rollers, the plate 24 may have an annular shoulder 41 with which the adjacent large rounded ends 42 of the rollers may make uniform rolling contact. In this manner, contact between the rollers at points 35 is assured.

As a result of using elongated as distinguished from spherical rollers, the following additional braking action occurs. Considering that the rollers are frictionally engaging each other in counteracting relation, it will be readily seen that the portion of a roller adjacent to the large end of cone 16 has a more rapid relative sliding motion with said cone and hence causes a greater retardation of the latter than the opposite end portion of the roller. The result is that the first mentioned end of the roller tends to move ahead of the second mentioned end of the roller in the direction of rotation of the cone 16. This action, which may be termed the angular wedging movement of the roller, produces a wedging action of the roller between the inner and outer races and substantially increases the effectiveness of the brake. Of course, such angular wedging action is governed by the space available therefor between the races, as by reason of a slight clearance, or because the action is mutual on the part of all the rollers, and the latter are relatively small in diameter as compared with the diameters of the races. A similar angular wedging action of the rollers occurs in respect to the outer race 17, but in greater degree because the peripheral speeds thereof are greater than those of the inner race. By making the rollers conoidal, as shown, the angular wedge action in respect to the outer race is further increased as will be apparent. Small as the angular wedging action necessarily is, it nevertheless produces a brake of high capacity without binding the parts of the brake for easy and rapid release.

One advantage of this invention is that a small motive power for causing axial relative movement of the races may suffice to afford the necessary engagement. Another advantage is that the brake will come into action smoothly and without any jarring effect. Moreover, a brake of this type, is adapted for a far greater wear than the ordinary brake or clutch, and with a uniformly higher reliability. The brake is uniformly efficient and also self adjusting for wear since the races 16 and 17 tend to move the rollers radially outward and inward respectively, upon tensioning the brake, so that these tendencies balance each other. This action is particularly effective when the conoidal surfaces are formed by a small angle, not greater than 15 degrees with the axis of the races. Normal clearances such as are provided in ordinary devices of this kind, and as hereinbefore mentioned, permit self adjustment if the wear on the races is unequal, and if the rollers happen to slightly vary in diameter, some of the rollers being capable of slightly different axial movements relative to each other, and yet maintaining contact with each other, when the brake is tensioned. By providing simple conoidal races, the machining is greatly simplified and the wear distributed uniformly; the rollers are of course extremely cheap to manufacture; at the same time, the inherent braking action between the contacting rollers is used to supplement the braking contact with the races, so that special supplemental braking constructions are avoided.

In Fig. 4 is shown a modification 45 of the invention which is generally similar to that disclosed at 15, but instead of the idlers or rollers 18 includes an idler means 46 which may be in the nature of a frusto conical ring of a suitable length adapted to be snugly fitted between the races. To supply lubricant to the race 16, the idler ring may have a series of openings 47 extending therethrough for communication between the inner race and the outer race to which lubricant may be furnished at 27. The ends of the idler ring may be square with the axis thereof for engagement with a suitable clearance between annular shoulders 48 and 49 of the race 17 and the plate 24. A means may be provided for releasing and maintaining released the idler ring with respect to the races, preferably automatically. Thus the race 16 may have an extension 50 having an annular flanged seat 51 for an expansion coil spring 52 acting between the same and the plate 24, whereby the race 17 is moved toward the left to disengage the idler ring from the outer race 17, and finally, when the abutment shoulder 49 strikes the idler 46, to release the idler from said inner race 16. For causing braking action, the race 17 is moved toward the right, causing first an engagement between the race 17 and the idler ring, and then with shoulder 48 abutting the latter, causing a movement toward the right of the idler ring and hence an engagement thereof with the inner race 16. The engagements mentioned may occur with an initial wiping contact for a gradual braking action.

The idlers 16 and 46 in effect constitute cam interengaging means between the inner and outer races so that the momentum of the vehicle may act to assure a powerful braking action, and, in any case, a relatively small amount of force being sufficient to produce the braking action.

The various friction surfaces may be of any suitable character, as for instance, case hardened steel having a tough core. But alloy steels may also be employed, and also tough materials of the type usually employed for braking surfaces.

In Fig. 5 is shown a modification of the invention embodied in a brake 55 having inner and outer races or cones 56, 57 respectively, and conoidal rollers 58 therebetween. In this brake, which is similar in principle to the brake 15, the rollers 58 are carried by the outer cone, which is normally stationary, the rollers, while so carried being out of contact with the inner rotating race 56, except when the brake is in action. Hence the cone 57 may have annular end walls 59, 60, of which the latter may be removably secured thereto by bolts 61. In these walls are pairs of alined recesses or bearings 62 for freely receiving, with a proper clearance, the alined stub shafts 63 at the ends of the individual rollers. Now, if the cone 57 is moved toward the left, the race 56 is disengaged, while upon a reverse movement, the rollers are all moved into snug engagement with the race 57, in which position, said rollers will be in side by side contact with each other for counteracting engagement as shown by arrows 39 in Fig. 3. The recesses 62 are of such size as not to interfere with the normal action of the rollers. The brake 55 may be mounted in the manner of brake 15, and the extension 64 of the inner cone is adapted to be connected to a wheel 11 in a similar manner.

In Figs. 6 to 8 is shown a further modification of the invention including a brake 65 which need not employ the counteracting contact of the rollers to obtain the braking action, but wherein the rollers are utilized between inner and outer races or the like for producing a gradual braking effect. The device 65 may include an inner race 66 that may be connected to the wheel 11, if desired, as by an end flange 67, and through which race the axle 14 may freely extend. The race is characterized in that, while it may be of generally cylindrical form, it may have a plurality of individual races or bearing grooves 68 for the different rollers 69. The latter may be of cylindrical form, and may be equally angularly spaced from each other, with all of their axes lying in a cylindrical surface whose diameter may be approximately equal to, or greater or less than that of the member 66, according to the area of contact desired between the rollers and the grooves 68. The latter may exactly conform to the shape of the rollers, and with a smooth fit. The rollers may be variously retained in their respective grooves. Thus they may have alined end stub shafts or trunnions 70, of which those at one end may be fitted in bearing recesses 71 formed in a shoulder 72 of the member 66, and those at the opposite end in bearing recesses 73 formed in an end plate 74 secured to the member 66 as by bolts 75, and having an opening 76 for the passage of the shaft 14. It will be noted that the rollers 69 form a peripheral roller surface which may lie outside of the adjacent surface of the members 66 and 74, so that while member 66 and the rollers 69 revolve with wheel 11 as a unit, another means, that may be external, may engage and frictionally clamp around the rollers and cause the latter to similarly engage in the grooves 68 of the member 66 to make the brake effective.

The external clamping means 77 may, for example, include a pair of semi-cylindrical members 78 that may be exact duplicates of each other. Preferably, each of these members includes opposite marginal longitudinal sections lying beyond the half circle, and which sections may be toothed as at 79, with the teeth of the members 77 mating, so that when the teeth are substantially fully inerfitted as shown in Fig. 7, the internal surface 80 of said members is of perfect cylindrical shape for snug contact with the rollers 69. The members 78 are movable apart along a diametral plane with the teeth 79 of the different members moving away from each other and yet guidingly maintaining the members in engagement with each other, and preventing any abrupt discontinuity in the internal surface 80. These fingers 79 may be omitted, if desired.

Any suitable means may be used for moving the members 78 toward and away from each other. Thus each member may have alined lugs 81 for mounting a shaft 82, the shafts for both members lying in a diametral plane and being parallel to each other. Arms 83, connected to said shafts at 84, may be pivotally interconnected at 85 and may cross each other as at 86 at a point intermediate of their ends. A shaft 87 carries a cam 88 for rotation thereby for moving apart the follower portions 89 of the arms 83 to bring the members 78 together to snugly engage around the rollers 69. A tension coil spring 90 tends to cause the arms to move the members 78 apart. It will be understood that since the axes at 85 and 87 are stationary, and the cam 88 symmetrical, the spring 90 which may be sufficiently powerful to maintain the arms in constant engagement with the cam, will assure a result such that the members 78 will always be in concentric relation with the member 66.

While the device 65 has been shown as being of cylindrical form, it can also be constructed of conoidal shape, in which case the center member need not be split but may be axially movable as hereinabove described, for engaging conoidal rollers and causing the latter to grip a conoidal inner member in corresponding conoidal grooves.

Thus it will be noted that recesses 68 may be formed along circles of a larger diameter than that of the rollers, to afford clearance and a degree of wedging engagement if desired, and especially it will be observed that in the operation of the various embodiments of this invention, the momentum of the vehicle is available to increase or accentuate the speed, power or both of the braking action.

It will be appreciated that various changes and modifications may be made in the device as shown in the drawings, and that the same is submitted in an illustrative and not in a limiting sense, the scope of the invention being defined in the following claims.

I claim:

1. A brake including inner and outer concentric races and rollers between the races, the latter and the rollers being each of conoidal shape and having their larger diameters adjacent to one end of the brake, the races being axially movable relatively to each other for exerting a bearing stress on the rollers, the rollers when so stressed being each in contact with the races and in side by side contact with each other for counteracting frictional engagement therebetween.

2. A brake including inner and outer conoidal concentric races, conoidal rollers between the races, said races being formed by angles not greater than 15 degrees with their common axis and being axially movable relatively to each other for exerting pressure on the rollers therebetween with the rollers being maintained in side by side contact with each other, and each roller being in contact with said races.

3. A brake including inner and outer conoidal concentric races, and a conoidal idler ring therebetween, the races and the ring tapering in the same direction, the inner and outer races being axially movable relatively to each other to cause the idler ring to engage therebetween.

4. A brake including inner and outer concentric elongated conoidal races forming a relatively small angle therebetween, conoidal idler means therebetween, said races being axially movable relatively to each other for releasing or causing the idler means to engage therebetween.

5. A brake including inner and outer concentric races and rollers between the races, the latter and the rollers being each of conoidal shape and having their larger diameters adjacent to one end of the brake, the races being axially movable relatively to each other for exerting a bearing stress on the rollers, the rollers when so stressed being each in contact with the races and in side by side contact with each other for counteracting frictional engagement therebetween, the inner race being secured to a wheel with the smaller end of the brake being nearest the wheel, and means for actuating the outer race to cause the relative axial movement.

6. A brake including concentric conoidal inner an douter races axially movable relatively to each other, and a series of conoidal rollers disposed side by side therebetween separately of each other and of the races, so that the rollers are adapted for a degree of rotation upon relative rotation between the races, and said rollers being so fitted between the races that upon said relative axial movement between the races to a position of exerting pressure upon the rollers, the rollers are each in contact with both races and in side by side contact with each other for counteracting frictional engagement between the rollers.

7. A brake including conoidal inner and outer coaxial races and a series of conoidal rollers therebetween, said races being axially movable relatively to each other for engaging and disengaging the rollers therebetween and in braking frictional relation with each other, and means for mounting the rollers on the outer race.

8. A brake including conoidal inner and outer coaxial races and a series of conoidal rollers therebetween, said races being axially movable relatively to each other for engaging and disengaging the rollers therebetween and for causing the rollers to frictionally uniformly engage each other, only one of said races being rotational, and said rollers being permanently mounted on the non-rotational race.

9. A brake having rollers positioned between and in contact with races, the rollers being in counter rolling side by side contact with each other, and means including the races adapted for tensioning operation between the races and rollers and causing the rollers to be maintained in contact with each other during said tensioning, to operate the brake.

10. A brake having inner and outer concentric races and elongated rollers therebetween extending in the general direction of the axis of the races, the latter and the rollers being of conoidal shape and having their larger diameters adjacent to one end of the brake, the races and rollers being movable relatively to each other in the general direction of said axis to cause the races to exert a bearing stress on the rollers, the rollers when so stressed being maintained in side by side line contact with each other for frictional engagement therebetween, and means to cause the relative axial movement and to maintain the races and rollers in engagement, for a torsional anguar wedging action therebetween, as set forth.

11. A brake having inner and outer concentric conoidal races, elongated conoidal rollers fitted therebetween and extending in the general direction of the axis of said races, the latter and the rollers being adapted for relative movement therebetween in the general direction of said axis, and means to cause said relative movement to cause the brake to operate, as set forth.

12. A brake including inner and outer conoidal coaxial races, an annular series of conoidal rollers between the races, said rollers having their axes extending in the general direction of the axis of the races, said races being relatively axially movable toward and away from each other, and means for causing said movement of one of the races.

13. A brake including inner and outer conoidal races, a series of conoidal rollers in contact with the races therebetween, said races and rollers extending in the same general direction, and one of said races being movable relatively to the other to release or clamp the rollers between the races at will.

14. A brake including inner and outer coaxial conoidal races, an annular series of coaxial conoidal rollers fitted between the races, said races being movable toward and away from each other to operate and release the brake, respectively, said rollers in the operated position of the brake being in side by side frictional contact with each other, as set forth.

15. A brake including inner and outer coaxial races, the outer race being uniformly circular in cross section, said races being elongated along the axis thereof, a single annular smooth walled idler means between the races, said idler means being elongated in the direction of said axis, said inner race having circularly rotatable engagement with said idler means, said inner race being rigid and having means for rotatably retaining the idler means at an end thereof, said outer race being movable to exert pressure on the idler means, and said idler means being in direct contact throughout with the inner and outer races and having frictional rolling engagement with the races, when subjected to said pressure, and said idler means being adapted to be released from said frictional engagement by movement of said outer race.

RAYMOND DE FILIPPIS.